June 19, 1962  A. J. SHAUKIS  3,039,564
CHECKING OUT SYSTEM
Filed July 29, 1959
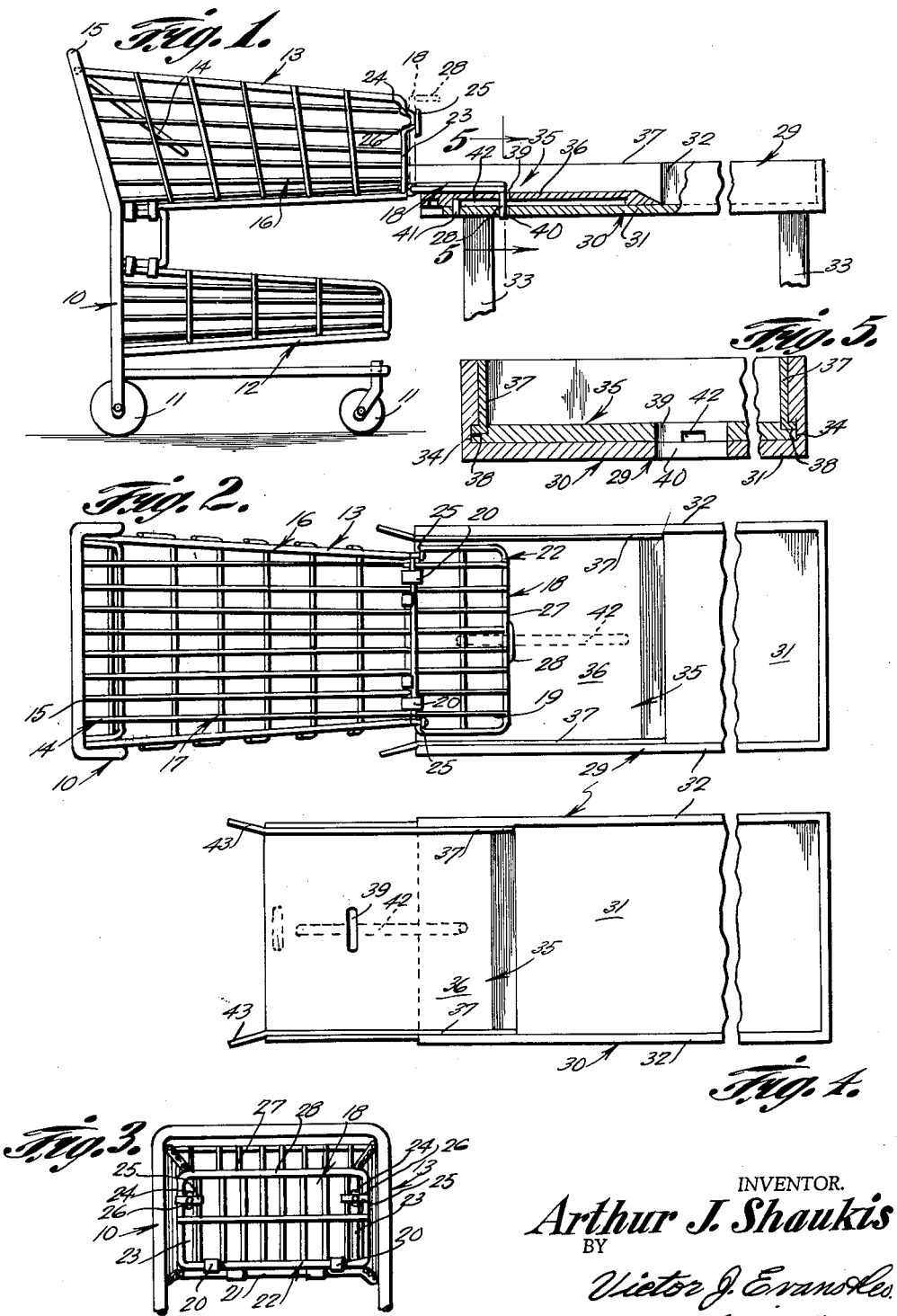
INVENTOR.
Arthur J. Shaukis
BY
Victor J. Evans &Co.
ATTORNEYS 3,039,564
CHECKING OUT SYSTEM
Arthur J. Shaukis, P.O. Box 689, Haverhill, Mass.
Filed July 29, 1959, Ser. No. 830,251
1 Claim. (Cl. 186—1)

This invention relates to a checking out system, and more particularly to a checking out system for use with a grocery store, super market or the like.

The object of the invention is to provide a checking out system wherein there is provided a cart which is mounted on wheels, and wherein the cart which is used for carrying groceries or other merchandise is provided with a hingedly mounted closure, so that the closure is capable of movement or swinging action about a horizontal axis so as to facilitate the removal of articles from the cart as for example, when the articles are being placed on a creck-out counter.

Another object of the invention is to provide a checking out system wherein the system is especially suitable for use in super markets, grocery stores or the like, since the carts which are used by customers in moving merchandise are constructed so that the carts have hingedly mounted closures which can be swung down to a horizontal position so as to facilitate the emptying of the carts, and wherein the check-out counter includes an extensible member or tray which can be readily extended or retracted as desired.

A further object of the invention is to provide a checking out system which is extremely simple and inexpensive to manufacture.

Other objects and advantages will be apparent during the course of the following description.

In the accompanying drawings, forming a part of this application, and in which like numerals are used to designate like parts throughout the same FIG. 1 is a fragmentary sectional view illustrating the present invention.

FIG. 2 is a plan view.

FIG. 3 is a fragmentary end elevational view.

FIG. 4 is a plan view of the check-out counter, showing the extensible member in extended position.

FIG. 5 is a sectional view taken on the line 5—5 of FIG. 1.

Referring in detail to the drawings, the numeral 10 indicates a cart which is adapted to be used in a super market or other locality, and the cart 10 includes wheels 11 and a lower section 12, and the lower section 12 may be of conventional construction. Each of the carts 10 further includes an upper article holding compartment or section 13 which is provided with a hingedly mounted rear member 14 that permits telescopic arrangement of the carts 10 when the carts 10 are not being used so that a plurality of the carts can be stacked in such a manner so as to occupy a minimum amount of space for storage. The cart 10 may include a framework which includes a portion 15 that defines a handle. As shown in FIG. 2, for example, the upper section or compartment 13 includes spaced apart side members 16 which are vertically disposed and there is further provided a horizontally disposed bottom portion 17. The upper compartment 13 is also provided with a hingedly mounted closure 18, and the closure 18 is mounted for swinging or pivotal movement about a horizontal axis. The closure 18 includes spaced apart ribs 19 and the closure 18 further includes a rectangular frame 22, FIG. 3, and the lower portion of the frame 22 is hingedly connected to a support portion 21 by means of hinges 20 so as to permit the swinging or pivotal movement of the closure 18.

The front of the side members 16 are indicated by the numerals 23, and the front portions 23 are provided with outwardly projecting shoulders 24, FIG. 1. Latches or keepers 25 are pivotally connected to the shoulders 24 as for example by means of pivot pins 26. The portion 27 of the closure frame 22 is provided with a lug 28, for a purpose to be later described.

As shown in the drawings, there is further provided a check-out counter which is indicated generally by the numeral 29, and the check-out counter 29 includes a stationary support member 30, and the support member 30 may include a horizontally disposed bottom wall 31 as well as spaced parallel vertically disposed side walls 32 and supporting legs 33, FIG. 5.

Associated with the stationary support member 30 is an extensible tray 35, and the tray 35 includes a bottom piece 36 as well as vertically disposed spaced parallel side pieces 37. As shown in FIG. 5 for example, there is provided on the lower side portions of the extensible tray 35 tongues 38 which are slidably mounted in grooves 34 which are formed or provided in the lower inner portions of the support member 30.

The bottom piece 36 of the extensible tray 35 is provided with a slot or opening 39 which is mounted for movement into and out of registry or alignment with a similar slot 40 in the bottom wall 31 of the support member 30, FIG. 5. These registering slots 39 and 40 are adapted to selectively receive the lug 28 of the closure 18, and this arrangement defines or provides an interengaging means between the cart 10 and the check-out counter.

A pin 41 extends upwardly from the bottom wall 31 of the member 30, and the pin 41 engages an elongated recess 42 in the lower surface of the bottom piece 36 of the tray 35.

From the foregoing, it is apparent that there has been provided a check-out system which will facilitate the handling of articles such as food packages in a super market. In use, the articles which are purchased are adapted to be placed in a compartment such as the compartment 13 of the cart 10, and then the cart 10 can be wheeled around the store in the usual manner as for example on the wheels 11. When it is desired to pay for the purchases, the cart 10 is pushed up to the check-out counter 29, as for example as shown in FIGS. 1 and 2. Normally the closure 18 is in a vertical position so that the articles cannot accidentally fall out of the upper compartment 13, and the closure 18 is maintained in a vertical position by means of the latches 25 as for example when the latches 25 are in the position shown in FIG. 3. To permit the closure to move from a vertical to a horizontal position, the latches 25 are pivoted on the pins 26 to a position which is 90 degrees from that shown in FIG. 3 whereby the closure 18 will be free to swing on the hinges 20. Then, the closure 18 can move to a horizontal position so that its lugs 28 can engages slots in the check-out counter 29 and with the closure 18 in such a horizontal position, the articles can be conveniently removed from the compartment 13 and placed on the counter 29. Thus, it will not be necessary to lift the articles up above the closure 18 since the articles can be conveniently slid or removed from the cart on to the counter 29.

Thus, it will be seen that there has been provided an improved checking out system for use in super markets or the like. In present day shopping centers, shopping baskets and counters which are used in checking out the items in super markets are slow and inconvenient because when the shopper loads the basket with the items and comes to the checking out counter, it is necessary to remove the items one by one from the basket and place them on the counter so they can be checked. This creates inconvenience and takes up lots of time which makes the other shoppers have to wait in line behind.

To eliminate these defects and bottlenecks, and to speed up the checking out, there has been provided a basket which is opened at the forward end so the items are checked while being removed from the basket instead of placing them on the counter and then checking them, and this provides greater convenience and speeds up the checking out that saves a great deal of time.

Furthermore, according to the present invention there is provided a system whereby the items may be easily checked whether the shopper has the basket fully loaded or comes to the counter with only a few items and does not use the basket as later described in this application. FIGS. 1 and 2 illustrate how the basket is hitched to the counter while in operation.

The basket or cart may be made from a suitable perforated sheet material, or it may be made from wire-like material and portions of the framework of the cart or basket may be made of heavier wire than the sides and bottom and the basket or upper compartment 13 has its front end open when the closure 18 is dropped down to a horizontal position. The cart includes a lower member 17, and the bottom portion 17 as well as the side portion 16 may be provided with spaced apart ribs or braces which are suitably attached to the proper portions or members. These ribs are provided for the purpose of forming the sides and bottom of the basket and to strengthen the same so that the sides will not bulge when the basket is filled.

The numeral 18 indicates the end closing gate or closure which includes an outer frame and thinner wires are suitably attached within the frame so as to complete the gate and the gate is hingedly connected to the bottom end of the basket by hinges or metal strips 20. The lower basket or member 12 may be of conventional construction.

The checking out counter which may be made of wood, is provided with upwardly extending walls 32 and the sliding member 35, and the sliding member 35 is provided with side portions 37 so that the items will not slide off of the counter when the tray is pulled out during the checking out process. The basket is steered into the proper position when approaching the checking out counter. The pin 41 functions as a stop member for the sliding section 35 when the same is pulled out.

When the basket or cart is to be used, the latches 25 are arranged in a vertical position so that the closure 18 can be moved from a horizontal to a vertical position whereby the latches 25 will pass through the spaces between the ribs of the closure 18 and then the latches 25 are moved 90 degrees to a position such as that shown in FIG. 3 so as to hold the gate or closure in closed position, whereby the basket is ready for use.

When the shopper brings the basket back filled with items to be checked, the checking-out counter is in position as shown in FIG. 4, and there is provided outwardly extending flanges 43 so that the basket will be steered into proper position for checking, and when the forward end of the basket is pushed close to the end of the counter, the knobs or latches 25 are moved to a vertical position, as for example as shown in FIG. 1 so that the gate or closure 18 can be opened and since the bottom of the basket and the counter are of the same height, the gate is brought down flat on the top of the counter as shown in FIGS. 1 and 2. This causes the member 28 to be engaged in the openings 39 and 40 so as to keep the basket in its proper position while the checking is made.

Then, as the checker stands in a position contiguous to the counter, he checks the items one by one as he removes them from the basket instead of first placing them on the counter and then checking them, as is required by the present old system so as to greatly speed up the checking out and thereby save a great deal of time.

When all items are checked out, then the gate 18 is brought back into former closing position as stated previously and the basket is again ready for use. It will be seen that the basket is provided with the usual back swinging gate 14 so that when the baskets are not in use, they may be telescoped within one another to save floor space.

When the shopper comes to the checking-out counter with only a few items to be checked and when not using the basket, the checker pulls out the upper sliding section 35 and checks them as usual. Then, when the next shopper approaches with the basket, then the sliding section 35 is pushed back into its former position as shown in FIG. 2 for example, and the counter is again ready to be used with the baskets. Thus, the tray 35 can be used either in an extended position as shown in FIGURE 4, or else it can be arranged and used in a retracted position, as for example as shown in FIGURE 1. When articles such as groceries are to be unloaded from the cart 10, the tray is in the retracted position of FIGURE 1 so that the articles can be conveniently removed from the cart 10 and placed on the tray 35 of the check-out counter. When the cart 10 is being unloaded onto the check-out counter, and in order to take maximum advantage of the coacting or interengaging elements such as the member 28 engaging the openings 39 and 40, the tray of the check-out counter is in the retracted position of FIGURE 1. In addition there are times when a shopper in a store or supermarket or the like only selects a few articles which are carried in the arms, and wherein a cart such as the cart 10 is not used, and in such instances the tray 35 can be extended outwardly as for example as shown in FIGURE 4 so that the articles being carried by the person can be placed directly from the person's arms onto the extended tray 35 in order to facilitate the checking out of such articles.

Thus, it will be seen that there has been provided a basket and checking-out system for super markets whereby the checking out is greatly speeded up and wherein there will be a great saving in time and inconvenience.

Minor changes in shape, size and rearrangement of details coming within the field of invention claimed may be resorted to in actual practice, if desired.

What is claimed is:

In a checking out system, a wheeled cart having a compartment located at the top thereof, and such compartment being defined by a horizontally disposed bottom portion, and spaced apart side members, a closure hingedly connected to said bottom portion and said closure being mounted for swinging movement about a horizontal axis, said side members being provided with outwardly projecting shoulders, and latches pivotally connected to said shoulders for selectively maintaining said closure in vertical position, a lug on the end portion of said closure, and a check-out counter comprising a support member which includes a horizontally disposed bottom wall and spaced parallel vertically disposed side walls, there being grooves in the lower inner portions of said side walls, an extensible tray including a bottom piece having a slot mounted for movement into and out of registry with a slot in the bottom wall of said counter for at times receiving the lug on said closure, said tray further including spaced parallel vertically disposed side pieces, tongues on the sides of said tray slidably engaging said grooves, there being an elongated recess in the lower portion of said tray, and a pin extending upwardly from said counter and engaging said recess.

References Cited in the file of this patent

UNITED STATES PATENTS

| | | |
|---|---|---|
| 1,145,478 | Gathright | July 6, 1915 |
| 1,753,637 | Arntzen | Apr. 8, 1930 |
| 2,317,438 | Bradley | Apr. 27, 1943 |
| 2,626,682 | Just | Jan. 27, 1953 |
| 2,653,845 | Benjamin | Sept. 29, 1953 |
| 2,672,218 | Genung | Mar. 16, 1954 |
| 2,943,707 | Ramlose | July 5, 1960 |